(12) United States Patent
Baiera (10) Patent No.: US 7,175,096 B2
(45) Date of Patent: Feb. 13, 2007

(54) DATA GLYPH FORMAT

(75) Inventor: Steven M. Baiera, Avon, NY (US)

(73) Assignee: Electronic Data Systems Corporation, Plano, TX (US)

( * ) Notice: Subject to any disclaimer, the term of this patent is extended or adjusted under 35 U.S.C. 154(b) by 223 days.

(21) Appl. No.: 10/741,318

(22) Filed: Dec. 18, 2003

(65) Prior Publication Data

US 2005/0133608 A1    Jun. 23, 2005

(51) Int. Cl.
*G06K 19/06* (2006.01)

(52) U.S. Cl. .................. 235/494; 235/454; 235/456

(58) Field of Classification Search ............ 235/494, 235/456, 460, 487, 454
See application file for complete search history.

(56) References Cited

U.S. PATENT DOCUMENTS

| | | | | |
|---|---|---|---|---|
| 5,221,833 A | * | 6/1993 | Hecht | 235/494 |
| 5,245,165 A | * | 9/1993 | Zhang | 235/454 |
| 5,315,098 A | * | 5/1994 | Tow | 235/494 |
| 5,984,189 A | * | 11/1999 | Tomioka | 235/487 |
| 6,000,613 A | * | 12/1999 | Hecht et al. | 235/456 |
| 6,076,738 A | * | 6/2000 | Bloomberg et al. | 235/494 |
| 2004/0046025 A1 | * | 3/2004 | Lebaschi et al. | 235/462.1 |

FOREIGN PATENT DOCUMENTS

| | | |
|---|---|---|
| DE | 19736202 A1 | 2/1998 |
| EP | 0331758 A1 | 9/1989 |
| EP | 0547858 A2 | 6/1993 |

* cited by examiner

*Primary Examiner*—Jared J. Fureman
*Assistant Examiner*—Daniel A. Hess
(74) *Attorney, Agent, or Firm*—Stephen R. Loe; Gardere Wynne Sewell (57) ABSTRACT

A data glyph and method, system, and computer program product for creating and reading the data glyph is provided. In one embodiment the data glyph is created by combining individual glyph elements, wherein each glyph element is selected from a list of glyph elements corresponding to one of each of the hexadecimal numerals 0, 1, 2, 3, 4, 5, 6, 7, 8, 9, A, B, C, D, E, and F. Each glyph element is made from darkening a unique subset of cells from an array of allowable cells.

30 Claims, 10 Drawing Sheets

Figure 1

200
Client

| Hex | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Braille | . | . | : | .. | .: | .. | :. | :: | :. | .. | . | : | .. | .: | .. | :. |
| Hex-a-Braille | ▦ | ▦ | ▦ | ▦ | ▦ | ▦ | ▦ | ▦ | ▦ | ▦ | ▦ | ▦ | ▦ | ▦ | ▦ | ▦ |

Mapping of ASCII Character Set to Hex-a-Braille format (Characters 0 – 31):

| Char | Dec | Binary | Hex | Braille | Hex-a-Braille |
|---|---|---|---|---|---|
| Null | 0 | 00000000 | 00 | ∴ | |
| | 1 | 00000001 | 01 | | |
| | 2 | 00000010 | 02 | | |
| | 3 | 00000011 | 03 | | |
| | 4 | 00000100 | 04 | | |
| | 5 | 00000101 | 05 | | |
| | 6 | 00000110 | 06 | | |
| Tab | 7 | 00000111 | 07 | | |
| | 8 | 00001000 | 08 | | |
| | 9 | 00001001 | 09 | | |
| | 10 | 00001010 | 0A | | |
| | 11 | 00001011 | 0B | | |
| | 12 | 00001100 | 0C | | |
| | 13 | 00001101 | 0D | | |
| | 14 | 00001110 | 0E | | |
| | 15 | 00001111 | 0F | | |
| | 16 | 00010000 | 10 | · ∷ | |
| | 17 | 00010001 | 11 | · · | |
| | 18 | 00010010 | 12 | · : | |
| | 19 | 00010011 | 13 | · ·· | |
| | 20 | 00010100 | 14 | · ·: | |
| | 21 | 00010101 | 15 | · ·. | |
| | 22 | 00010110 | 16 | · :· | |
| | 23 | 00010111 | 17 | · :: | |
| | 24 | 00011000 | 18 | · :. | |
| | 25 | 00011001 | 19 | · .· | |
| | 26 | 00011010 | 1A | · · | |
| | 27 | 00011011 | 1B | · : | |
| | 28 | 00011100 | 1C | · ·· | |
| | 29 | 00011101 | 1D | · ·: | |
| | 30 | 00011110 | 1E | · ·. | |
| | 31 | 00011111 | 1F | · :· | |

Mapping of ASCII Character Set to Hex-a-Braille format (Characters 32 – 63):

| Char | Dec | Binary | Hex | Braille | Hex-a-Braille |
|---|---|---|---|---|---|
| Space | 32 | 00100000 | 20 | : ∴ | |
| ! | 33 | 00100001 | 21 | : · | |
| " | 34 | 00100010 | 22 | : : | |
| # | 35 | 00100011 | 23 | : ·· | |
| $ | 36 | 00100100 | 24 | : ·: | |
| % | 37 | 00100101 | 25 | : ·. | |
| & | 38 | 00100110 | 26 | : :· | |
| ' | 39 | 00100111 | 27 | : :: | |
| ( | 40 | 00101000 | 28 | : :. | |
| ) | 41 | 00101001 | 29 | : .· | |
| * | 42 | 00101010 | 2A | : · | |
| + | 43 | 00101011 | 2B | : : | |
| , | 44 | 00101100 | 2C | : ·· | |
| - | 45 | 00101101 | 2D | : ·: | |
| . | 46 | 00101110 | 2E | : ·. | |
| / | 47 | 00101111 | 2F | : :· | |
| 0 | 48 | 00110000 | 30 | ·· ∴ | |
| 1 | 49 | 00110001 | 31 | ·· · | |
| 2 | 50 | 00110010 | 32 | ·· : | |
| 3 | 51 | 00110011 | 33 | ·· ·· | |
| 4 | 52 | 00110100 | 34 | ·· ·: | |
| 5 | 53 | 00110101 | 35 | ·· ·. | |
| 6 | 54 | 00110110 | 36 | ·· :· | |
| 7 | 55 | 00110111 | 37 | ·· :: | |
| 8 | 56 | 00111000 | 38 | ·· :. | |
| 9 | 57 | 00111001 | 39 | ·· .· | |
| : | 58 | 00111010 | 3A | ·· · | |
| ; | 59 | 00111011 | 3B | ·· : | |
| < | 60 | 00111100 | 3C | ·· ·· | |
| = | 61 | 00111101 | 3D | ·· ·: | |
| > | 62 | 00111110 | 3E | ·· ·. | |
| ? | 63 | 00111111 | 3F | ·· :· | |

Figure 8A

Mapping of ASCII Character Set to Hex-a-Braille format (Characters 64–95):

| Char | Dec | Binary | Hex |
|---|---|---|---|
| @ | 64 | 01000000 | 40 |
| A | 65 | 01000001 | 41 |
| B | 66 | 01000010 | 42 |
| C | 67 | 01000011 | 43 |
| D | 68 | 01000100 | 44 |
| E | 69 | 01000101 | 45 |
| F | 70 | 01000110 | 46 |
| G | 71 | 01000111 | 47 |
| H | 72 | 01001000 | 48 |
| I | 73 | 01001001 | 49 |
| J | 74 | 01001010 | 4A |
| K | 75 | 01001011 | 4B |
| L | 76 | 01001100 | 4C |
| M | 77 | 01001101 | 4D |
| N | 78 | 01001110 | 4E |
| O | 79 | 01001111 | 4F |
| P | 80 | 01010000 | 50 |
| Q | 81 | 01010001 | 51 |
| R | 82 | 01010010 | 52 |
| S | 83 | 01010011 | 53 |
| T | 84 | 01010100 | 54 |
| U | 85 | 01010101 | 55 |
| V | 86 | 01010110 | 56 |
| W | 87 | 01010111 | 57 |
| X | 88 | 01011000 | 58 |
| Y | 89 | 01011001 | 59 |
| Z | 90 | 01011010 | 5A |
| [ | 91 | 01011011 | 5B |
| \ | 92 | 01011100 | 5C |
| ] | 93 | 01011101 | 5D |
| ^ | 94 | 01011110 | 5E |
| _ | 95 | 01011111 | 5F |

Mapping of ASCII Character Set to Hex-a-Braille format (Characters 96–127):

| Char | Dec | Binary | Hex |
|---|---|---|---|
| ` | 96 | 01100000 | 60 |
| a | 97 | 01100001 | 61 |
| b | 98 | 01100010 | 62 |
| c | 99 | 01100011 | 63 |
| d | 100 | 01100100 | 64 |
| e | 101 | 01100101 | 65 |
| f | 102 | 01100110 | 66 |
| g | 103 | 01100111 | 67 |
| h | 104 | 01101000 | 68 |
| i | 105 | 01101001 | 69 |
| j | 106 | 01101010 | 6A |
| k | 107 | 01101011 | 6B |
| l | 108 | 01101100 | 6C |
| m | 109 | 01101101 | 6D |
| n | 110 | 01101110 | 6E |
| o | 111 | 01101111 | 6F |
| p | 112 | 01110000 | 70 |
| q | 113 | 01110001 | 71 |
| r | 114 | 01110010 | 72 |
| s | 115 | 01110011 | 73 |
| t | 116 | 01110100 | 74 |
| u | 117 | 01110101 | 75 |
| v | 118 | 01110110 | 76 |
| w | 119 | 01110111 | 77 |
| x | 120 | 01111000 | 78 |
| y | 121 | 01111001 | 79 |
| z | 122 | 01111010 | 7A |
| { | 123 | 01111011 | 7B |
| | | 124 | 01111100 | 7C |
| } | 125 | 01111101 | 7D |
| ~ | 126 | 01111110 | 7E |
|   | 127 | 01111111 | 7F |

Figure 8B

Mapping of ASCII Character Set to Hex-a-Braille format (Characters 128–159):

| Char | Dec | Binary | Hex | Braille | Hex-a-Braille |
|---|---|---|---|---|---|
| € | 128 | 10000000 | 80 | :..: | |
| • | 129 | 10000001 | 81 | :.- | |
| , | 130 | 10000010 | 82 | :.: | |
| ƒ | 131 | 10000011 | 83 | :.-- | |
| „ | 132 | 10000100 | 84 | :.·: | |
| … | 133 | 10000101 | 85 | :.·. | |
| † | 134 | 10000110 | 86 | :.:· | |
| ‡ | 135 | 10000111 | 87 | :.:: | |
| ˆ | 136 | 10001000 | 88 | :.:. | |
| ‰ | 137 | 10001001 | 89 | :..· | |
| Š | 138 | 10001010 | 8A | :.· | |
| ‹ | 139 | 10001011 | 8B | :.: | |
| Œ | 140 | 10001100 | 8C | :.·· | |
| • | 141 | 10001101 | 8D | :.·: | |
| Ž | 142 | 10001110 | 8E | :.·- | |
| • | 143 | 10001111 | 8F | :.:· | |
| • | 144 | 10010000 | 90 | .·.: | |
| ' | 145 | 10010001 | 91 | .·.· | |
| ' | 146 | 10010010 | 92 | .·.: | |
| " | 147 | 10010011 | 93 | .·.·· | |
| " | 148 | 10010100 | 94 | .·:· | |
| • | 149 | 10010101 | 95 | .·:. | |
| – | 150 | 10010110 | 96 | .·:· | |
| — | 151 | 10010111 | 97 | .·:: | |
| ˜ | 152 | 10011000 | 98 | .·:. | |
| ™ | 153 | 10011001 | 99 | .·.· | |
| š | 154 | 10011010 | 9A | .·· | |
| › | 155 | 10011011 | 9B | .·: | |
| œ | 156 | 10011100 | 9C | .··· | |
| • | 157 | 10011101 | 9D | .·:: | |
| ž | 158 | 10011110 | 9E | .··. | |
| Ÿ | 159 | 10011111 | 9F | .·:· | |

Mapping of ASCII Character Set to Hex-a-Braille format (Characters 160–191):

| Char | Dec | Binary | Hex | Braille | Hex-a-Braille |
|---|---|---|---|---|---|
|   | 160 | 10100000 | A0 | ·.: | |
| ¡ | 161 | 10100001 | A1 | ·. | |
| ¢ | 162 | 10100010 | A2 | ·: | |
| £ | 163 | 10100011 | A3 | ·-- | |
| ¤ | 164 | 10100100 | A4 | ··: | |
| ¥ | 165 | 10100101 | A5 | ·.. | |
| ¦ | 166 | 10100110 | A6 | ·:· | |
| § | 167 | 10100111 | A7 | ·:: | |
| ¨ | 168 | 10101000 | A8 | ·:. | |
| © | 169 | 10101001 | A9 | ·.· | |
| ª | 170 | 10101010 | AA | ·· | |
| « | 171 | 10101011 | AB | ·: | |
| ¬ | 172 | 10101100 | AC | ··· | |
| - | 173 | 10101101 | AD | ··: | |
| ® | 174 | 10101110 | AE | ··. | |
| ¯ | 175 | 10101111 | AF | ·:· | |
| ° | 176 | 10110000 | B0 | :.: | |
| ± | 177 | 10110001 | B1 | :. | |
| ² | 178 | 10110010 | B2 | :: | |
| ³ | 179 | 10110011 | B3 | :-- | |
| ´ | 180 | 10110100 | B4 | :·: | |
| µ | 181 | 10110101 | B5 | :·. | |
| ¶ | 182 | 10110110 | B6 | :·· | |
| · | 183 | 10110111 | B7 | :·: | |
| ¸ | 184 | 10111000 | B8 | :·. | |
| ¹ | 185 | 10111001 | B9 | :.· | |
| º | 186 | 10111010 | BA | :· | |
| » | 187 | 10111011 | BB | :: | |
| ¼ | 188 | 10111100 | BC | :·· | |
| ½ | 189 | 10111101 | BD | :·: | |
| ¾ | 190 | 10111110 | BE | :·. | |
| ¿ | 191 | 10111111 | BF | ::· | |

Figure 8C

Mapping of ASCII Character Set to Hex-a-Braille format (Characters 192–223):

| Char | Dec | Binary | Hex | Braille | Hex-a-Braille |
|---|---|---|---|---|---|
| À | 192 | 11000000 | C0 | ¨: | |
| Á | 193 | 11000001 | C1 | ¨. | |
| Â | 194 | 11000010 | C2 | ¨: | |
| Ã | 195 | 11000011 | C3 | ¨.. | |
| Ä | 196 | 11000100 | C4 | ¨·: | |
| Å | 197 | 11000101 | C5 | ¨·. | |
| Æ | 198 | 11000110 | C6 | ¨:· | |
| Ç | 199 | 11000111 | C7 | ¨:: | |
| È | 200 | 11001000 | C8 | ¨·. | |
| É | 201 | 11001001 | C9 | ¨.· | |
| Ê | 202 | 11001010 | CA | ¨·· | |
| Ë | 203 | 11001011 | CB | ¨·: | |
| Ì | 204 | 11001100 | CC | ¨·· | |
| Í | 205 | 11001101 | CD | ¨·: | |
| Î | 206 | 11001110 | CE | ¨·. | |
| Ï | 207 | 11001111 | CF | ¨:· | |
| Ð | 208 | 11010000 | D0 | ·:. | |
| Ñ | 209 | 11010001 | D1 | ·:· | |
| Ò | 210 | 11010010 | D2 | ·:; | |
| Ó | 211 | 11010011 | D3 | ·:.. | |
| Ô | 212 | 11010100 | D4 | ·:·: | |
| Õ | 213 | 11010101 | D5 | ·:·. | |
| Ö | 214 | 11010110 | D6 | ·:;· | |
| × | 215 | 11010111 | D7 | ·:;: | |
| Ø | 216 | 11011000 | D8 | ·::. | |
| Ù | 217 | 11011001 | D9 | ·::·  | |
| Ú | 218 | 11011010 | DA | ·:·· | |
| Û | 219 | 11011011 | DB | ·:·: | |
| Ü | 220 | 11011100 | DC | ·:·· | |
| Ý | 221 | 11011101 | DD | ·:·: | |
| Þ | 222 | 11011110 | DE | ·:·. | |
| ß | 223 | 11011111 | DF | ·:·: | |

Mapping of ASCII Character Set to Hex-a-Braille format (Characters 224–255):

| Char | Dec | Binary | Hex | Braille | Hex-a-Braille |
|---|---|---|---|---|---|
| à | 224 | 11100000 | E0 | ·.: | |
| á | 225 | 11100001 | E1 | ·.. | |
| â | 226 | 11100010 | E2 | ·.; | |
| ã | 227 | 11100011 | E3 | ·... | |
| ä | 228 | 11100100 | E4 | ·.·: | |
| å | 229 | 11100101 | E5 | ·.·. | |
| æ | 230 | 11100110 | E6 | ·.;· | |
| ç | 231 | 11100111 | E7 | ·.:: | |
| è | 232 | 11101000 | E8 | ·.·. | |
| é | 233 | 11101001 | E9 | ·.·· | |
| ê | 234 | 11101010 | EA | ·.·· | |
| ë | 235 | 11101011 | EB | ·.·: | |
| ì | 236 | 11101100 | EC | ·.·· | |
| í | 237 | 11101101 | ED | ·.·: | |
| î | 238 | 11101110 | EE | ·.·. | |
| ï | 239 | 11101111 | EF | ·.·: | |
| ð | 240 | 11110000 | F0 | ::. | |
| ñ | 241 | 11110001 | F1 | ::· | |
| ò | 242 | 11110010 | F2 | ::; | |
| ó | 243 | 11110011 | F3 | ::.. | |
| ô | 244 | 11110100 | F4 | ::·: | |
| õ | 245 | 11110101 | F5 | ::·. | |
| ö | 246 | 11110110 | F6 | ::;· | |
| ÷ | 247 | 11110111 | F7 | ::;: | |
| ø | 248 | 11111000 | F8 | ::.. | |
| ù | 249 | 11111001 | F9 | ::.· | |
| ú | 250 | 11111010 | FA | ::·· | |
| û | 251 | 11111011 | FB | ::·: | |
| ü | 252 | 11111100 | FC | ::·· | |
| ý | 253 | 11111101 | FD | ::·: | |
| þ | 254 | 11111110 | FE | ::·. | |
| ÿ | 255 | 11111111 | FF | ::·: | |

Figure 8D

DATA GLYPH FORMAT

BACKGROUND OF THE INVENTION

1. Technical Field

The present invention relates generally to computer software and, more particularly, to generating and reading data glyphs and other two dimensional barcodes.

2. Description of Related Art

Data glyphs and barcodes are used extensively in industry for embedding information within printed documents, soft documents, and on products. These glyphs and barcodes can be scanned to retrieve a variety of information. For example, a document may be encoded with a data glyph or barcode which, when read by a computer, identifies the location at which a soft copy of the document may be retrieved, thereby allowing a user to retrieve and edit the document. Without the barcode or data glyph, the location at which a soft copy of a document is stored may be unknowable in an environment in which thousands of documents are created and stored.

Another area in which data glyphs and barcodes are utilized which may be more familiar to most people is on products available for purchase in various stores. Each product is labeled with, for example, a bar code which identifies the product and allows the store to associate a price with the product. Thus, when the store scans the product, the price is automatically entered into the cash register.

One problem with many existing glyphs and/or barcodes is that they are based on the binary or decimal numeric systems. This limits the amount of data that can be stored in a glyph or barcode per unit area of glyph or barcode. Because barcodes and glyphs are being used in more and more applications to store larger amounts of data, it would be desirable to have a glyph that can store a greater amount of data per unit area than is possible with existing glyphs.

SUMMARY OF THE INVENTION

The present invention provides a data glyph and method, system, and computer program product for creating and reading the data glyph. In one embodiment the data glyph is created by combining individual glyph elements, wherein each glyph element is selected from a list of glyph elements corresponding to one of each of the hexadecimal numerals 0, 1, 2, 3, 4, 5, 6, 7, 8, 9, A, B, C, D, E, and F. Each glyph element is made from darkening a unique subset of cells from an array of allowable cells.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
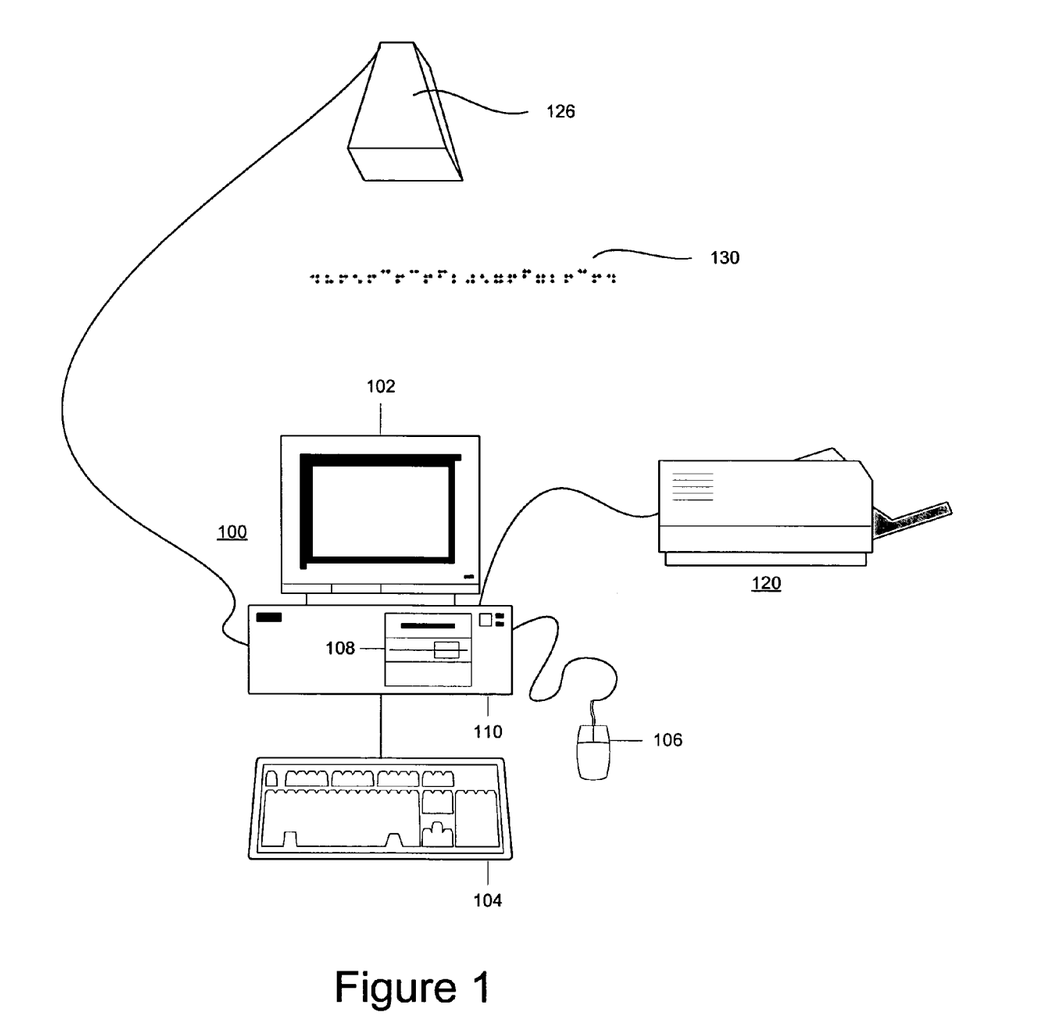
FIG. 1 depicts a pictorial representation of a data processing system, scanner, and printer in which the present invention may be implemented.

With reference now to the figures, and in particular with reference to FIG. 1, a pictorial representation depicts a data processing system, scanner, and printer in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and a pointing device 106, such as a mouse. A scanner 126 is also connected to computer 100 to scan glyphs 130. Computer 100 may also be connected to a network or Internet and receive software glyphs through, for example, a browser. Additional input devices may be included with personal computer 100, as will be readily apparent to those of ordinary skill in the art.

Computer 100 may also be utilized to create glyphs. Glyphs created by computer 100 may be displayed on a video display terminal 102, sent to another computer, stored as software, or printed on printer 120 which is connected to computer 100. The glyphs of the present invention are described in more detail below.

The personal computer 100 can be implemented using any suitable computer. Although the depicted representation shows a personal computer, other embodiments of the present invention may be implemented in other types of data processing systems, such as mainframes, workstations, network computers, Internet appliances, palm computers, etc. Furthermore, although scanner 126 is depicted as a handheld scanner, other types of scanners may be utilized as well.

The system unit 110 comprises memory, a central processing unit, one or more I/O units, and the like. However, in the present invention, the system unit 110 preferably contains a speculative processor, either as the central processing unit (CPU) or as one of multiple CPUs present in the system unit.

Figure 2:
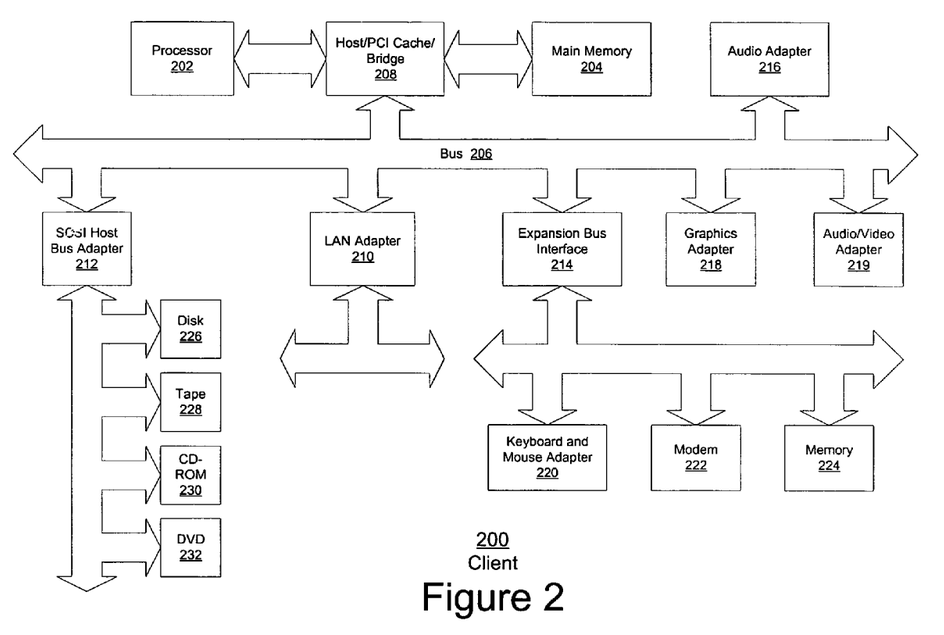
FIG. 2 depicts a block diagram of a data processing system in which the present invention may be implemented.

With reference now to FIG. 2, a block diagram of a data processing system in which the present invention may be implemented is illustrated. Data processing system 200 is an example of a data processing system that may be implemented as, for example, computer 100 in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, a SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 200. Instructions for the operating system, the object-oriented programming system, and applications or programs are located on a storage device, such as hard disk drive 226, and may be loaded into main memory 204 for execution by processor 202. The applications may include instructions for generating, translating, and/or reading Hex-A-Braille Glyphs in accordance with the present invention.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
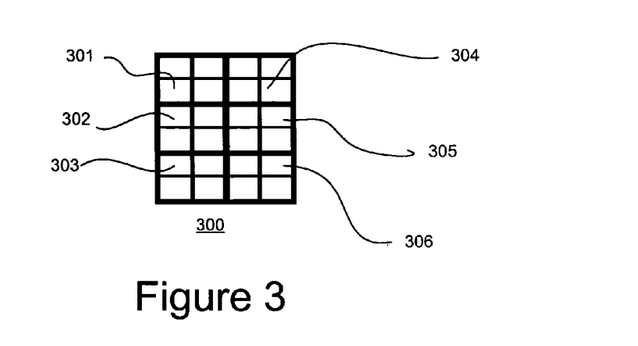
FIG. 3 illustrates the six cells which may be darkened or left blank in order to create a Hex-A-Braille glyph according to the present invention.
Figure 4:
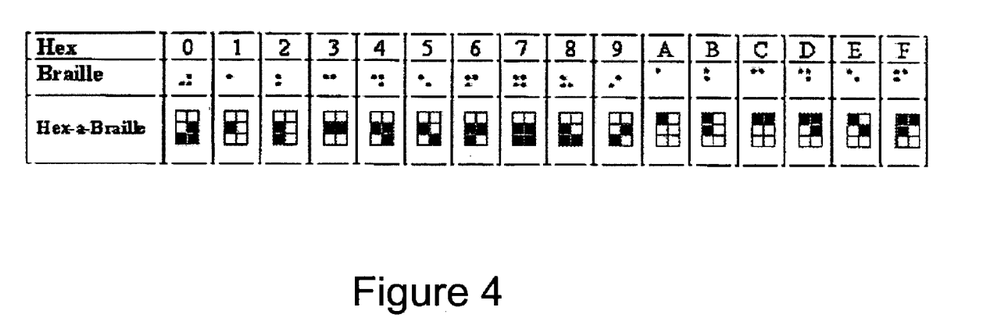
FIG. 4 depicts a table illustrating the relationship between a hexadecimal numeral and a Hex-A-Braille glyph.

With reference now to FIGS. 3 and 4, FIG. 3 illustrates the six cells which may be darkened or left blank in order to create a Hex-A-Braille Glyph according to the present invention and FIG. 4 provides a table illustrating the relationship between a hexadecimal numeral and a Hex-A-Braille Glyph.

In order to create a glyph that offers a higher capacity for storing information per unit area than a barcode or glyph based on the binary (base-2) or decimal (base 10) systems, a hexadecimal (base-16) system is selected. For example, the letter "e" in the ASCII character set is character number 101 (Base 10). 101 (Base 10) is equal to 01100101 (Base 2), which is eight digits long. 101 (Base 10) is also equal to 65 (Base 16), which is just two digits long. Thus, the hexadecimal system offers an improvement in capacity over both the decimal and binary-based systems because it requires fewer digits to represent the same data element.

The next part of the solution is to map the elements of the hexadecimal system to unique machine readable visual patterns. Each pattern should be based on the same structure and that structure should be as compact as possible. The Base 2 or binary system can be easily represented by a variety of patterns, such as, for example forward slashes and backslashes (/ and \). The decimal (Base 10) and hexadecimal (Base 16) are more challenging to represent because their systems contain more unique elements (ten and sixteen respectively) that need to be patterned. This challenge is met by using a visual pattern based on the Braille system. Thus, the name of the glyph of the present invention, Hex-A-Braille.

Hex-A-Braille may be used to represent both the process of creating the glyph and the resulting glyph. The Hex-A-Braille Process is the process of mapping hexadecimal data into a visual representation or pattern in a Hex-A-Braille Glyph. The glyph may exist in various mediums: hard copy print, soft copy files, or onscreen displays, etc. Because it is based in the hexadecimal system, it is easily understandable and allows for inclusion of sophisticated features such as encryption, compression, error checking and more.

The Hex-A-Braille Glyph 300 is composed of six cells 301–306 arranged in a three row by two column format as shown in FIG. 3. The lines delineating the cells 301–306 are there for illustration and readability only. These lines are not part of the Hex-A-Braille Glyph 300 structure. Each of the six cells 301–306 in the glyph 300 is of equal size and is comprised of one or more addressable units, which is determined by various factors such as the intended application or use; medium where the glyph 300 will exist; and the resolution of the devices used to both create and read the resulting glyph 300 structure. In the depicted example (FIG. 3), each of cells 301–306 has four addressable units per cell. Because the cell 301–306 size and thus resulting glyph 300 size may vary from application to application, so will the amount of data that can be stored in any given area. The amount of data that can be "stored" in a given area is inversely proportional to the size of the glyph 300. As the cell 301–306 and thus glyph 300 size increases, the capacity per area or density decreases, and vise-versa. Maximum density is reached when each Hex-A-Braille Glyph 300 is comprised of cells 301–306 equaling one unit of measure, which represents the lowest addressable space for a given medium, for example a single pixel of a video display unit, or a single dot on a printed piece of paper.

No value is assigned to any of the six individual cells 301–306 making up the glyph 300. It is the resulting pattern produced by the collective combination of cells 301–306, which holds value. The pattern formed by the shaded cells 301–306 of the Hex-A-Braille Glyph is representative of the Braille pattern for the respective numbers/characters making up the Hexadecimal (Base 16) numeric system. The table depicted in FIG. 4 illustrates the relationship between the Hexadecimal values (0–15) represented by the Hexadecimal numbers/characters (0–F) and the Braille System. The chart also depicts the corresponding Hex-A-Braille Glyph in the bottom row.

The Hex-A-Braille format is superior to simple two dimensional barcodes in the amount of data that can be stored and in the number of distinct characters that can be represented within the data marking. Additionally, the Hex-A-Braille format offers benefits over binary-based data glyph formats such as the competing binary format illustrated below.

Figure 5:
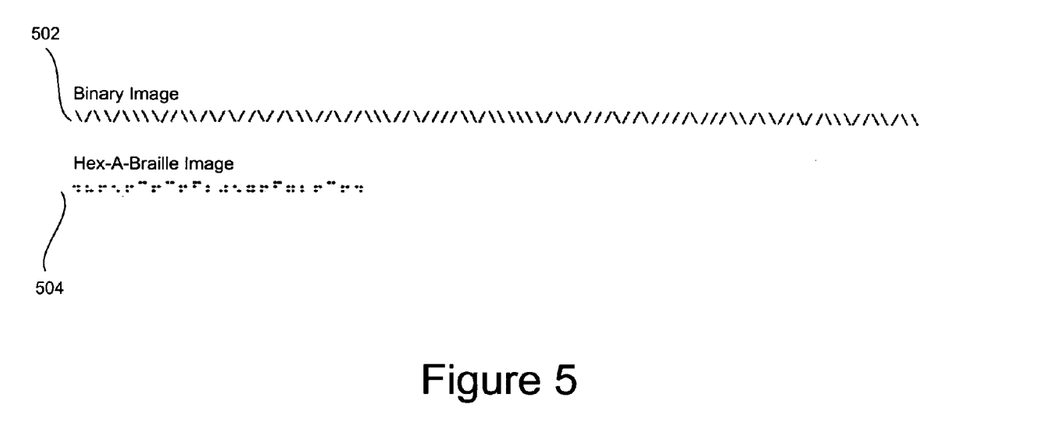
FIG. 5 depicts a comparison of a binary glyph and a Hex-A-Braille glyph representations of the same message.

Consider the following text message: "Hello World". The decimal ASCII values for this message (including the space between "Hello" and "World") are 72, 101, 108, 108, 111, 032, 087, 111, 114, 108, and 100. The binary ASCII values for this message are 01001000, 01100101, 01101100, 01101100, 01101111, 00100000, 01010111, 01101111, 01110010, 01101100, 01100100. The Hexadecimal ASCII Values for the same message are 48, 65, 6C, 6C, 6F, 20, 57, 6F, 72, 6C, and 64. It is clear just from looking at the resulting number of characters needed to represent the message that the Hexadecimal system represents a significant increase in data density over the decimal system and a far superior data density over the binary system. Referring to FIG. 5, a binary glyph 502 representing the message "Hello World" is presented along with a Hex-A-Braille Glyph 504 of the same message using the similar font size for both glyphs. This comparison makes an even more striking statement as to the superiority of the Hex-A-Braille Glyph over prior art glyphs such as binary glyph 502. Thus, the Hex-A-Braille image requires fewer characters and thus offers a higher density form factor.

Much like barcodes and other glyphs the Hex-A-Braille Glyph of the present invention provides a means for machines to communicate with one another through the visual patterns of the glyph. While glyphs and barcodes are similar in nature, a glyph is typically far more sophisticated. The Hex-A-Braille Glyph can be used like a simple barcode or for more complex applications, such as, for example, providing in-line, real-time finishing instructions to a copier or printer as the original document is created, providing a means of re-creating an entire document based on a small glyph placed on the document itself, using the Hex-A-Braille Glyph to load entire programs into a device capable of reading the glyph. Furthermore, the Hex-A-Braille Glyph could be displayed as a graphic or part of a graphic on a web page. The browser could then interpret the glyph and act accordingly. The Hex-A-Braille Glyph also provides some security against prying eyes since data in a glyph is easily readable by machines but masked to the users.

Applications for the Hex-A-Braille Glyph are really somewhat limitless. Any data elements may be encoded into a glyph, which can be stored or represented in a variety of mediums. These glyphs can then be read by a variety of devices for a variety of purposes. The Hex-A-Braille Glyph offers a potential 4× capacity improvement over binary-based glyphs. The 6 cell (3 row×2 column) format of the Hex-A-Braille Glyph is also expected to offer additional capacity over other existing glyph based upon a larger footprint.

The Hex-A-Braille Glyphs illustrated in FIGS. 3–5 are provided as examples of a Hex-A-Braille Glyph. Those skilled in the art will recognize that many modifications to the glyph of the present invention may be made without departing from the scope or spirit of the present invention. For example, rather than having a 2-column by 3-row glyph, the glyph could be placed on its side as a 3-column, 2-row glyph. Furthermore, other schemes for uniquely mapping a hexadecimal numeral to the Hex-A-Braille Glyph other than that provided by the Braille system may be utilized.

Figure 6:
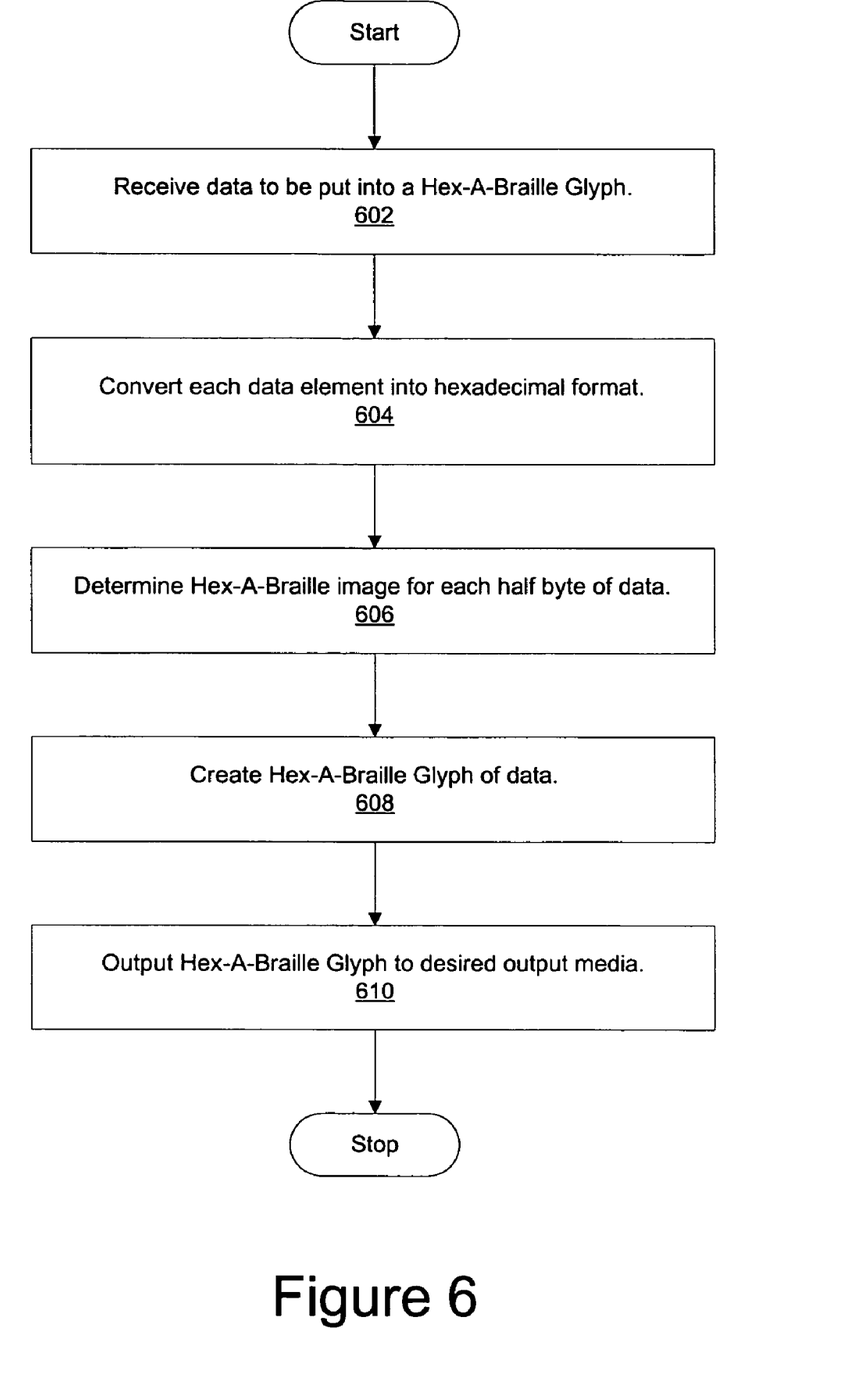
FIG. 6 depicts a process flow and program function for generating a Hex-A-Braille glyph in accordance with one embodiment of the present invention.

With reference now to FIG. 6, a process flow and program function for generating a Hex-A-Braille Glyph is depicted in accordance with one embodiment of the present invention. This process may be implemented, for example, as a set of computer readable instructions executed within a data processing system, such as data processing system 200 depicted in FIG. 2. To begin, data to be put into a Hex-A-Braille Glyph is received (step 602). The data to be put into a Hex-A-Braille Glyph may be any information desired for the particular application. For example, the data may be text, computer code, or inventory numbers for a product which may be in raw, compressed and/or encrypted format. Next, each data element representing the information desired to be represented as a Hex-A-Braille Glyph is converted into a hexadecimal format (step 604). The Hex-A-Braille image for each hexadecimal half byte of data is determined (step 606) by mapping each hexadecimal character to a unique set of darkened cells within a matrix of cells. A Hex-A-Braille Glyph of the information is then created by combining, in the proper order, the individual Hex-A-Braille images for each hexadecimal character (step 608). The resulting Hex-A-Braille Glyph is then output to an appropriate output medium, such as, for example, printed onto paper, stored in software, or displayed on a video display terminal (step 610).

Figure 7:
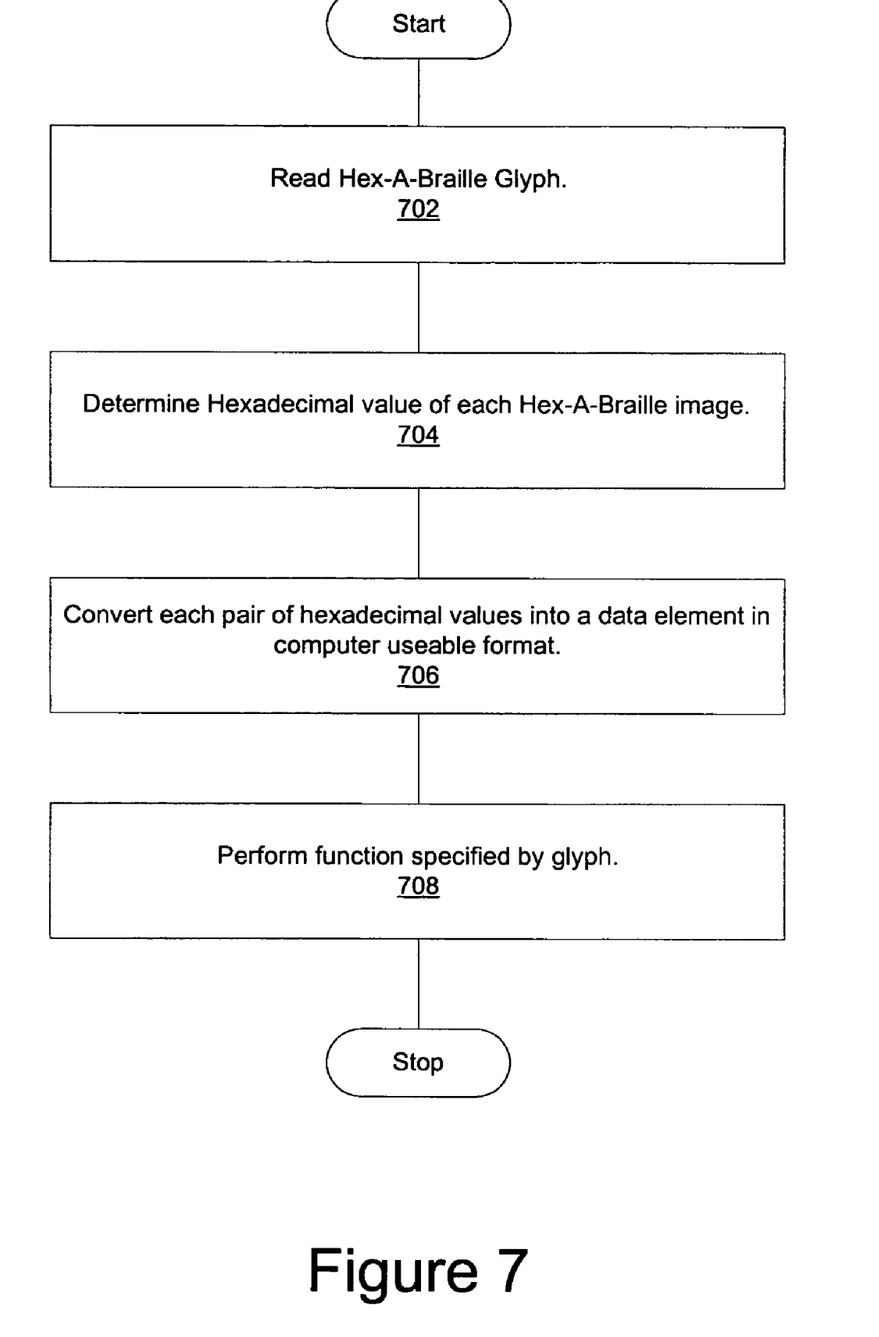
FIG. 7 depicts a process flow and program function for reading a Hex-A-Braille glyph in accordance with one embodiment of the present invention.
Figure 8A:
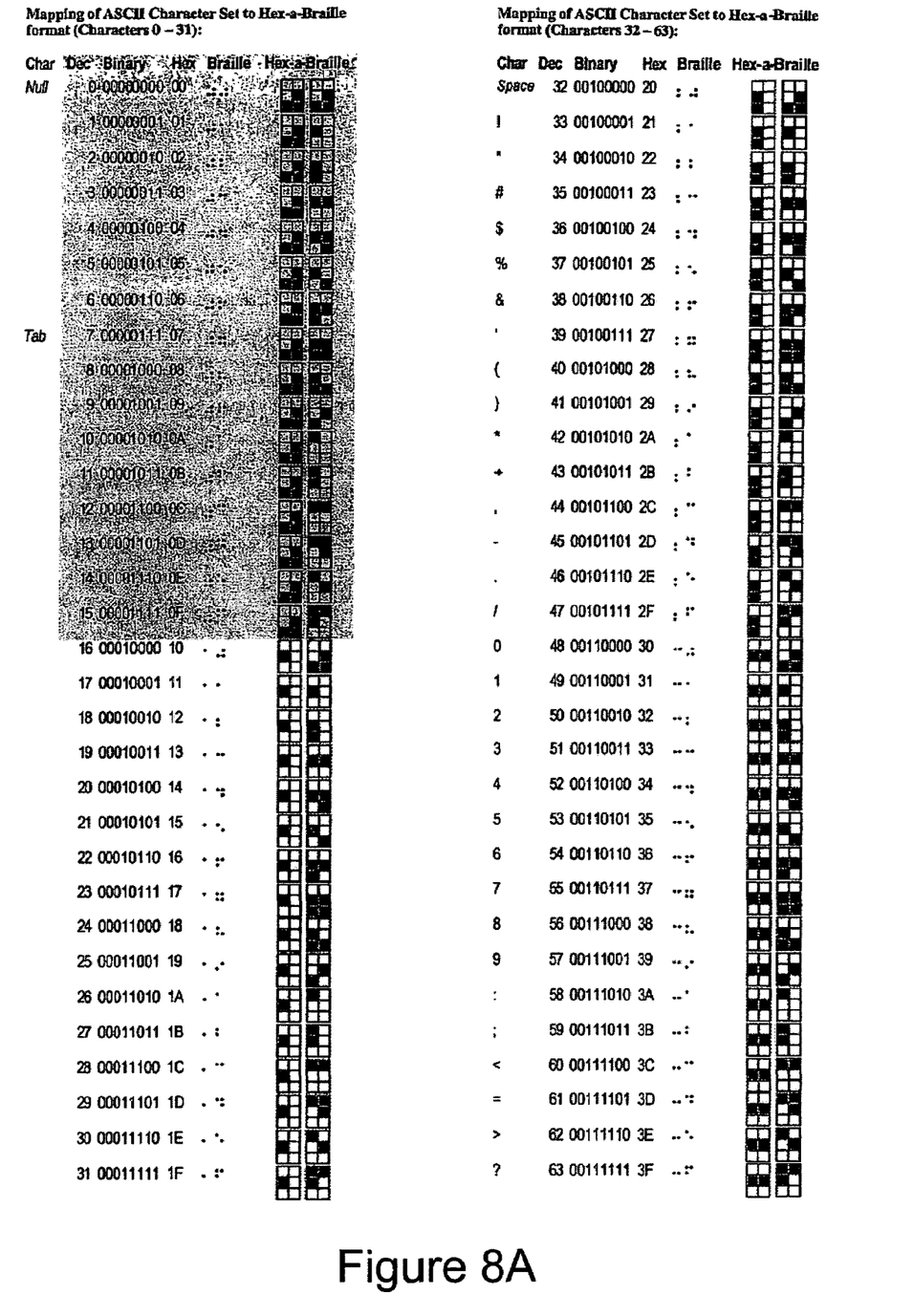
FIGS. 8A–8D depict tables illustrating mapping of ASCII characters to Hex-A-Braille format according to one embodiment of the present invention.
Figure 8B:
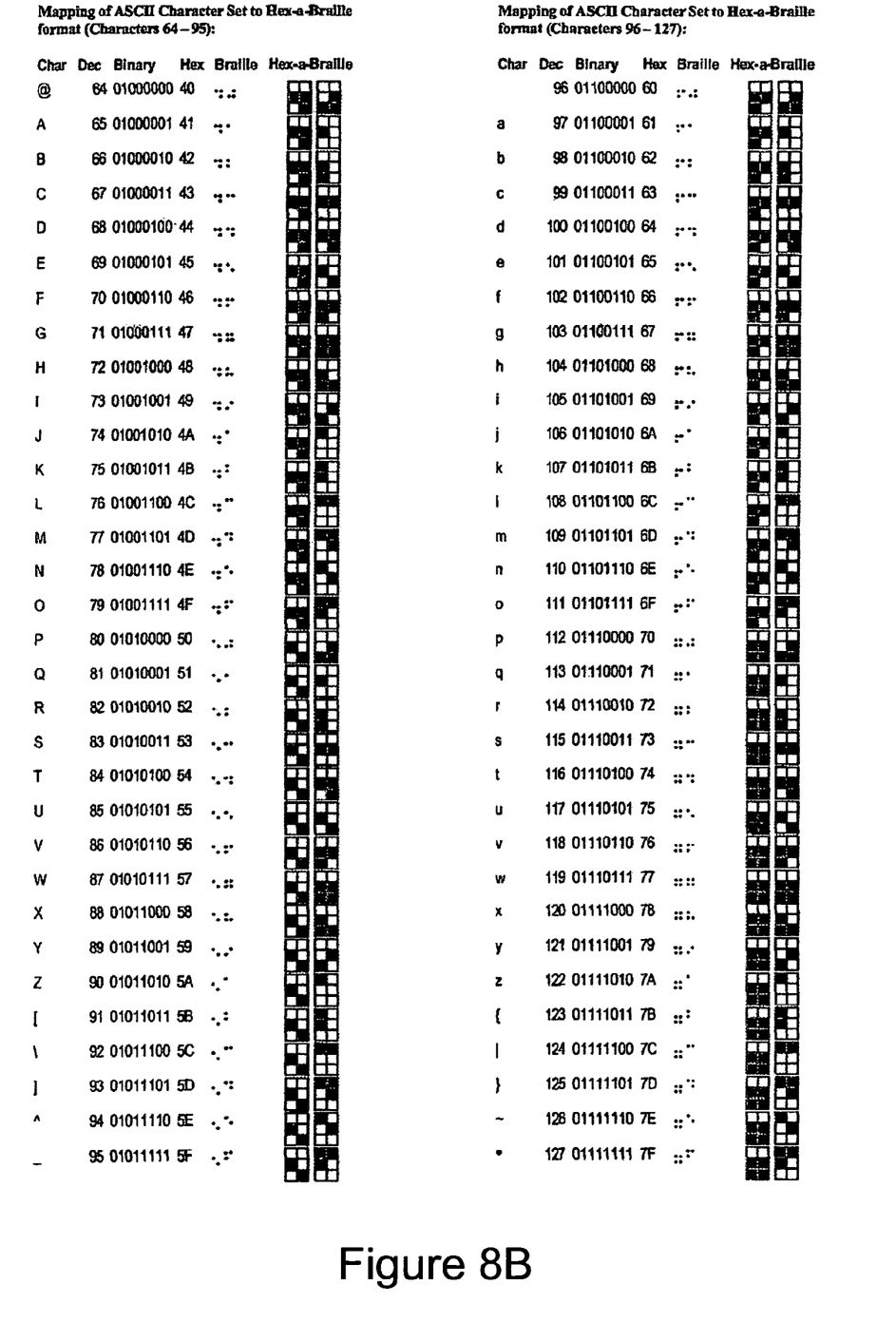
Figure 8C:
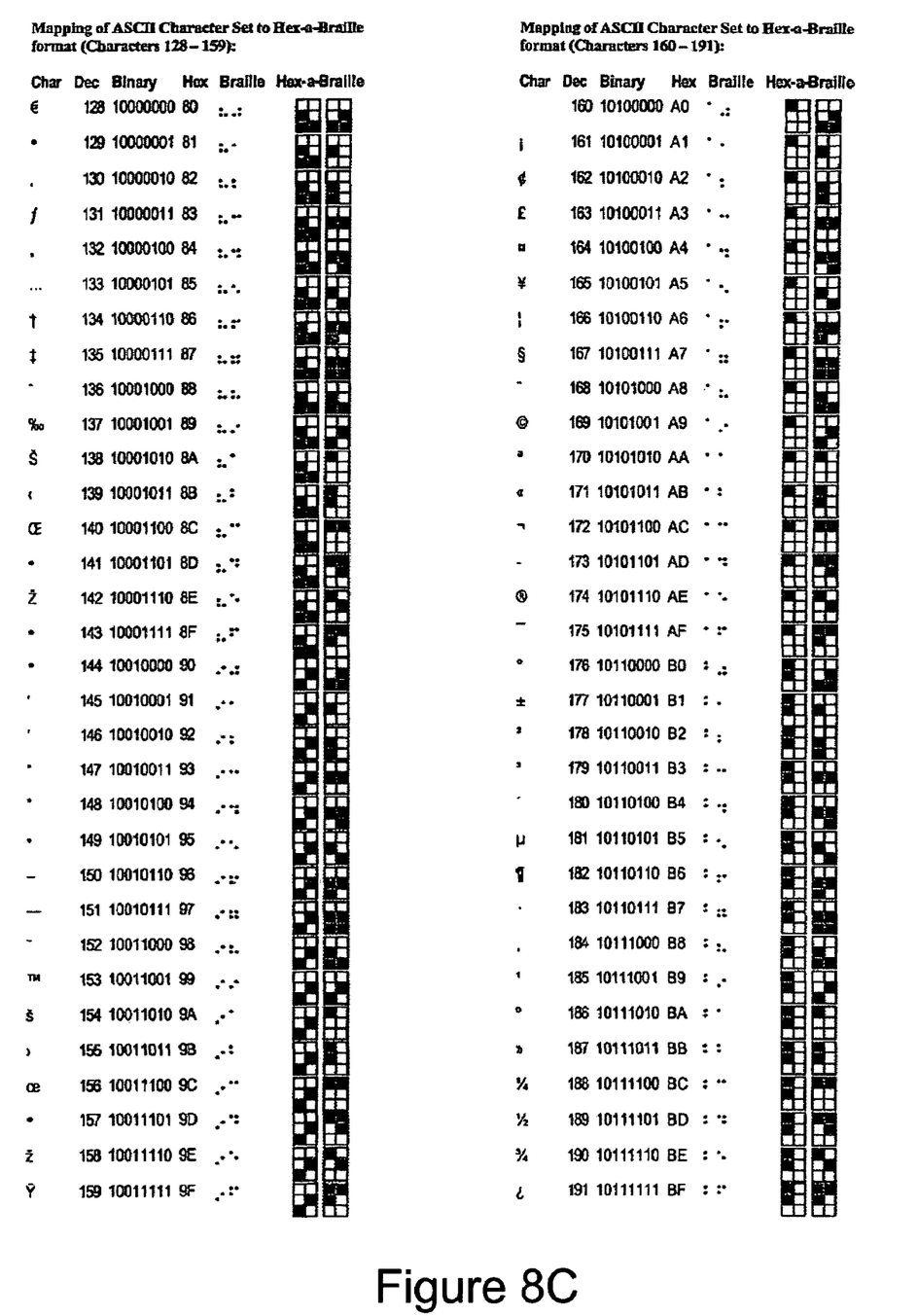
Figure 8D:
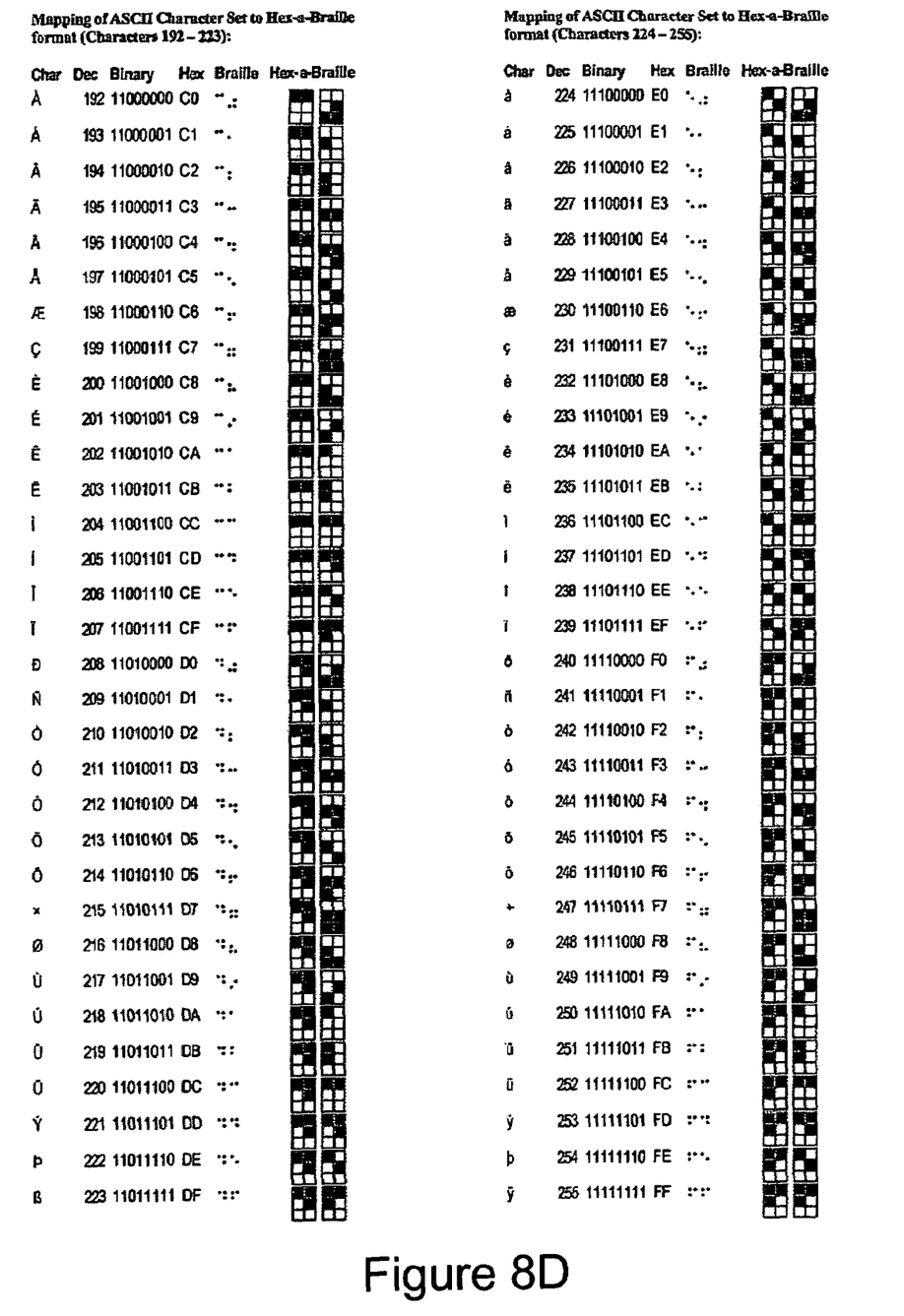

With reference now to FIG. 7, a process flow and program function for reading a Hex-A-Braille Glyph is depicted in accordance with one embodiment of the present invention. This process, as with that depicted in FIG. 6, may be implemented, for example, as a set of computer readable instructions executed within a data processing system, such as data processing system 200 depicted in FIG. 2. To begin, a Hex-A-Braille Glyph is read (step 702). This may be performed, for example, by scanning an image of a Hex-A-Braille Glyph on a physical object or by decoding a Hex-A-Braille image within a web page displayed in a web browser. The Hexadecimal value of each Hex-A-Braille image is determined (step 704). Each pair of hexadecimal values is converted into a data element in a computer useable format (step 706) and the function(s) specified by the glyph and associated glyph reading software are performed (step 708). For example, the Hex-A-Braille Glyph may simply be a Universal Product Code (UPC) which is used by software in the reading computer to lookup, for example, pricing information corresponding to the UPC in a database of UPCs and associated prices.

In other examples, in a manufacturing context, glyphs could be printed on part labels or packaging materials. These glyphs could then be read by machines on a plant floor assembly line. The machine could then react based on the data or instructions contained within the glyph. In an office context, scanners, faxes, copiers, printers, multifunction devices, and other similar devices could be designed to interact with glyphs. In other examples of uses of Hex-A-Braille Glyphs, computer hardware and software can be developed to create, read and react to glyphs or other devices via such glyphs. For example, PCs could download programs from a document or web page in the format of a glyph.

In the security, banking, and finance areas, identification (ID) cards, smart cards, credit cards, and the like could have data encoded in a glyph which could be read and interpreted by a glyph reader. A photo could actually be encoded into a glyph rather than displayed in plain site. Readers could be used to display the photos to confirm identity. Furthermore, any existing barcode application could be replaced with more sophisticated Hex-A-Braille Glyphs.

FIGS. 8A–8D depict tables illustrating mapping of ASCII characters to Hex-A-Braille format according to one embodiment of the present invention. Those skilled in the art will recognize that other mapping tables are possible that will also result in a mapping of an ASCII character to a unique Hex-A-Braille Glyph not shared by any other ASCII character. Additional data mappings such as Unicode to Hex-A-Braille are also possible. Also note that characters which are typically nonprintable such as ASCII character zero (null) are now given a visual representation with Hex-A-Braille.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for encoding a security data glyph on an individual's identification document, the method comprising:
   receiving data that represents an image of the individual;
   creating a data glyph containing information that can be used by a data processing system to recreate the image of the individual, wherein the data glyph comprises at least one multi-cellular hex-a-braille glyph, individual cells within a hex-a-braille glyph are valueless, and value is assigned based only upon the unique pattern formed by a complete hex-a-braille glyph; and
   affixing the data glyph to the individual's identification document wherein the image represented by the data glyph is not visible to an unaided observer.

2. The method as recited in claim 1, wherein the identification document is one of an identification card, a smart card, and a credit card.

3. The method as recited in claim 1, wherein the data glyph is a formed from hexadecimal data glyph characters.

4. A method for decoding a security data glyph on an individual's identification document, the method comprising:
   reading a security glyph from an individual's identification document wherein the security data glyph encodes an image of the individual, the image is not visible to an unaided observer, the security glyph comprises at least one multi-cellular hex-a-braille glyph , individual cells within a hex-a-braille glyph are valueless, and value is assigned to a hex-a-braille glyph based only upon the unique pattern formed by a complete hex-a-braille glyph;
   recreating the image encoded by the data glyph to produce a recreated image of the individual; and
   displaying the recreated image to a user, wherein the user compares the recreated image with the individual to verify identity.

5. The method as recited in claim 4, wherein the identification document is one of an identification card, a smart card, and a credit card.

6. The method as recited in claim 4, wherein the data glyph is formed from hexadecimal data glyph characters.

7. A computer program product in a computer readable media for use in a data processing system for encoding a security data glyph on an individual's identification document, the computer program product comprising:
   first instructions for receiving data that represents an image of the individual;
   second instructions for creating a data glyph containing information that can be used by a data processing system to recreate the image of the individual, wherein the data glyph comprises at least one multi-cellular hex-a-braille glyph, individual cells within a hex-a-braille glyph are valueless, and value is assigned based only upon the unique pattern formed by a complete hex-a-braille glyph; and
   third instructions for affixing the data glyph to the individual's identification document wherein the image represented by the data glyph is not visible to an unaided observer.

8. The computer program product as recited in claim 7, wherein the identification document is one of an identification card, a smart card, and a credit card.

9. The computer program product as recited in claim 7, wherein the data glyph is a formed from hexadecimal data glyph characters.

10. A computer program product in a computer readable media for use in a data processing system for decoding a security data glyph on an individual's identification document, the computer program product comprising:
    first instructions for reading a security glyph from an individual's identification document wherein the security data glyph encodes an image of the individual, the image is not visible to an unaided observer, the security glyph comprises at least one multi-cellular hex-a-braille glyph, individual cells within a hex-a-braille glyph are valueless, and value is assigned to a hex-a-braille glyph based only upon the unique pattern formed by a complete hex-a-braille glyph;
    second instructions for recreating the image encoded by the data glyph to produce a recreated image of the individual; and
    third instructions for displaying the recreated image to a user, wherein the user compares the recreated image with the individual to verify identity.

11. The computer program product as recited in claim 10, wherein the identification document is one of an identification card, a smart card, and a credit card.

12. The computer program product as recited in claim 10, wherein the data glyph is formed from hexadecimal data glyph characters.

13. A system in a computer readable media for use in a data processing system for encoding a security data glyph on an individual's identification document, the system comprising:
    first means for receiving data that represents an image of the individual;
    second means for creating a data glyph containing information that can be used by a data processing system to recreate the image of the individual, wherein the data glyph comprises at least one multi-cellular hex-a-braille glyph, individual cells within a hex-a-braille glyph are valueless, and value is assigned based only upon the unique pattern formed by a complete hex-a-braille glyph; and
    third means for affixing the data glyph to the individual's identification document wherein the image represented by the data glyph is not visible to an unaided observer.

14. The system as recited in claim 13, wherein the identification document is one of an identification card, a smart card, and a credit card.

15. The system as recited in claim 13, wherein the data glyph is a formed from hexadecimal data glyph characters.

16. A system in a computer readable media for use in a data processing system for decoding a security data glyph on an individual's identification document, the system comprising:
    first means for reading a security glyph from an individual's identification document wherein the security data glyph encodes an image of the individual, the image is not visible to an unaided observer, the security glyph comprises at least one multi-cellular hex-a-braille glyph, individual cells within a hex-a-braille glyph are valueless, and value is assigned to a hex-a-braille glyph based only upon the unique pattern formed by a complete hex-a-braille glyph; second means for recreating the image encoded by the data glyph to produce a recreated image of the individual; and third means for displaying the recreated image to a user, wherein the user compares the recreated image with the individual to verify identity.

17. The system as recited in claim 16, wherein the identification document is one of an identification card, a smart card, and a credit card.

18. The system as recited in claim 16, wherein the data glyph is formed from hexadecimal data glyph characters.

19. An individual's security encoded identification document, comprising:

an identification document; and a data glyph; wherein the data glyph encodes an image of the individual that is not visible to an unaided observer, the data glyph is readable by a data processing system such that the data processing system can recreate the image encoded by the data glyph, the data glyph comprises at least one multi-cellular hex-a-braille glyph, individual cells within a hex-a-braille glyph are valueless, and value is assigned to a hex-a-braille glyph based only upon the unique pattern formed by a complete hex-a-braille glyph.

20. The individual's security encoded identification document as recited in claim 19, wherein the data glyph comprises hexadecimal data glyph characters.

21. The individual's security encoded identification document as recited in claim 19, wherein the identification document comprises one of an identification card, a smart card, and a credit card.

22. A method for creating a data glyph, the method comprising:

receiving information to be encoded into the data glyph;

converting characters representing the information into corresponding hexadecimal characters;

determining a glyph character for each hexadecimal character; and arranging the individual glyph characters to produce a data glyph; wherein each different hexadecimal character is represented by a unique multi-cellular glyph character, wherein mapping to a hexadecimal character set is based on the Braille system;

individual cells within a glyph character are valueless; and value is assigned to a glyph character based only upon the unique pattern formed by a complete glyph character.

23. The method as recited in claim 22, wherein the identification document is one of an identification card, a smart card, and a credit card.

24. The method as recited in claim 22, wherein the data glyph comprises increased storage capacity as compared to other glyphs.

25. A computer program product in a computer readable media for use in a data processing system for creating a data glyph, the computer program product comprising:

first instruction for receiving information to be encoded into the data glyph;

second instructions for converting characters representing the information into corresponding hexadecimal characters;

third instructions for determining a glyph character for each hexadecimal character; and fourth instructions for arranging the individual glyph characters to produce a data glyph;

wherein each different hexadecimal character is represented by a unique multi-cellular glyph character, wherein mapping to a hexadecimal character set is based on the Braille system;

individual cells within a glyph character are valueless; and value is assigned to a glyph character based only upon the unique pattern formed by a complete glyph character.

26. The computer program product as recited in claim 25, wherein the identification document is one of an identification card, a smart card, and a credit card.

27. The computer program product as recited in claim 25, wherein the data glyph comprises increased storage capacity as compared to other glyphs.

28. A system for creating a data glyph, the system comprising:

first means for receiving information to be encoded into the data glyph;

second means for converting characters representing the information into corresponding hexadecimal characters;

third means for determining a glyph character for each hexadecimal character; and fourth means for arranging the individual glyph characters to produce a data glyph;

wherein each different hexadecimal character is represented by a unique multi-cellular glyph characters, wherein mapping to a hexadecimal character set is based on the Braille system;

individual cells within a glyph character are valueless; and value is assigned to a glyph character based only upon the unique pattern formed by a complete glyph character.

29. The system as recited in claim 28, wherein the identification document is one of an identification card, a smart card, and a credit card.

30. The system as recited in claim 28, wherein the data glyph comprises increased storage capacity as compared to other glyphs.

* * * * *